3,019,812
HIGH TEMPERATURE VALVE
Rollin Douglas Rumsey, Buffalo, N.Y., assignor to Houdaille Industries, Inc., Buffalo, N.Y., a corporation of New York
Filed Oct. 27, 1958, Ser. No. 769,854
6 Claims. (Cl. 137—557)

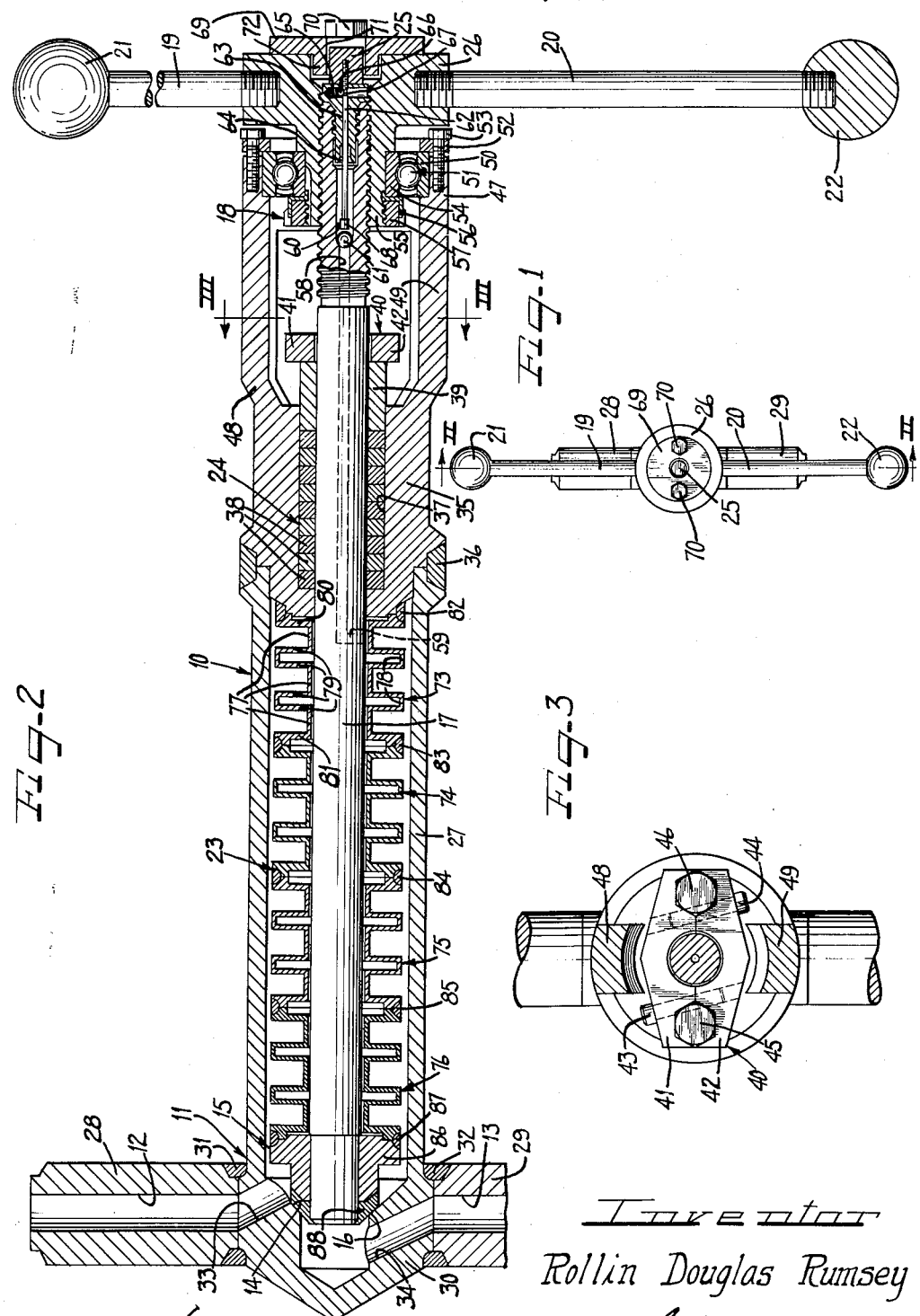

This invention was evolved with the general object of providing a valve suitable for high temperature, high pressure service in handling extremely corrosive and/or hazardous fluids and with the specific object of providing a valve for handling zirconium tetrachloride and hafnium tetrachloride, both of which materials are extremely corrosive and hazardous and have a high solidification temperature.

Further objects of the invention reside in the provision of a valve which is compact, readily and economically constructed and easily operated and yet is safe and reliable in operation under high temperature and high pressure conditions with toxic, poisonous, radioactive or other corrosive or hazardous fluids.

Another object of the invention is to provide a valve having indicating means from which the condition of operation of the valve is readily apparent.

According to this invention, a valve is provided of the type including a casing having a valve seat between inlet and outlet passages with a valve part including a surface portion engageable with the valve seat and a stem or rod portion projecting outwardly through an opening in a wall portion of the casing. A metallic bellows is disposed around the rod portion and is integrally connected at one end to the valve part and at the other end to the casing to prevent flow of fluid out through the opening through which the rod portion extends, while allowing inward and outward movement of the valve part. With this arrangement, a completely metallic seal is possible and the valve may be safely used with high temperature, corrosive and/or hazardous fluids. Preferably, the bellows is welded to the valve part and casing.

The metallic bellows is also suitable for use under high pressure conditions to meet normal safety factor requirements. However, in certain hazardous fluid applications, an extremely high factor of safety is required and it is not possible as a practical matter to make the bellows heavy enough to meet such requirements. A highly important feature of this invention is in the provision of a secondary seal in the form of a packing, preferably metallic, between the casing and the rod portion of the valve part. By the use of such a secondary seal, it is possible to meet the most severe safety factor standards and yet use a metallic bellows which provides the advantage of a complete metallic seal and which may be reasonably expected to withstand pressures to be encountered.

In the remote possibility that the bellows should rupture, the packing is then effective to provide the seal and it is possible that after a period of use, a small amount of fluid might escape through the packing. According to a further feature of the invention, means are provided for indicating rupture of the bellows to thus signify that the valve should be repaired or replaced before such loss of fluid can occur. The construction of such indicating means forms an important specific feature of the invention, as will appear hereinafter.

Another important feature of the valve of this invention is that it is suitable for high temperature applications. In accordance with this feature, actuating means for effecting reciprocable movement of the valve part are supported from the outer end of the cylindrical portion of the casing so that the cylindrical portion of the casing not only serves to enclose the bellows but also provides an elongated heat flow path between the fluid and the actuating means.

A further feature of the valve of this invention is that it is suitable for fluids having a freezing or solidification point at a high temperature. In accordance with this feature, the bellows is integrally connected at its inner end to the valve part and at its outer end to the cylindrical portion of the casing, so that the space between the bellows and the cylindrical portion of the casing is in communication with one of the valve passages so as to be filled with fluid. Heat may be readily applied to the outside of the casing, as by means of a heating blanket, to be thereby transferred to the fluid within the valve passages and the fluid around the bellows. Accordingly, the valve can be readily and quickly rendered fit for use.

This invention contemplates other and more specific objects, features and advantages which will become more fully apparent from the following detailed description taken in conjunction with the accommodating drawings which illustrate a preferred embodiment and in which:

FIGURE 1 is a top plan view of a valve constructed according to the principles of this invention;

FIGURE 2 is a sectional view, on an enlarged scale, taken substantially along line II—II of FIGURE 1; and FIGURE 3 is a sectional view taken substantially along line III—III of FIGURE 2.

Reference numeral 10 generally designates a valve constructed according to the principles of this invention. The valve 10 comprises a casing generally indicated by reference numeral 11, having a pair of passages 12 and 13 therewithin with a valve seat 14 between passages 12 and 13. A valve part, generally indicated by reference numeral 15, has a surface portion 16 movable toward and away from the seat 14, to control the flow of fluid between passages 12 and 13. The valve part 15 also includes a stem or rod portion 17 projecting outside the casing, for actuation through a mechanism generally indicated by reference numeral 18, which is manually actuatable by means of handles 19 and 20 having knobs 21 and 22 on the ends thereof. The handles 19 and 20 may be rotated about the axis of the rod portion 17 to effect inward and outward movement thereof, and to thereby effect movement of the surface portion 16 toward and away from the valve seat 14.

An important feature of the invention is in the provision of a bellows 23 integrally connected at one end to the valve part 15 and at the other end to the casing 11 to prevent flow of fluid out of the casing while accommodating inward and outward movement of the valve part.

Another important feature of the invention is in the provision of a secondary seal in the form of a packing 24 between the rod portion 17 and the casing, to prevent flow of fluid outside the casing in the event of rupture of the bellows 23.

Another feature of the invention is in the provision of means for indicating rupture of the bellows 23, such means including a button 25 in a hub member 26 which supports handles 19 and 20, the button 25 being projected outwardly in response to a certain fluid pressure in the space between bellows 23 and packing 24, to thus indicate rupture of the bellows 23.

A still further feature of the invention is in the provision of a generally cylindrical portion 27 on the casing 11 in generally coaxial relation to the rod portion 17, which serves to enclose the bellows 23 and also serves to provide an elongated heat flow path between the fluid and the actuating mechanism 18, the actuating mechanism being supported from the outer end of the cylindrical portion 27.

The casing 11 comprises a pair of tubular members 28 and 29 secured to opposite sides of a central member 30 by means of welds 31 and 32. The central member 30 is formed with the valve seat 14 and with passages 33 and 34 which communicate with the openings of the tubular members 28 and 29 to form the passages 12 and 13.

The central member 30 is formed integrally with the cylindrical portion 27 of the casing, the inside of the cylindrical portion 27 being in communication with the passage 12.

A sleeve member 35 is secured to the outer end of the cylindrical portion 27 by means of a weld 36 so as to form an integral extension of the cylindrical portion 27. The opening through the sleeve member 35 has a portion 37 of a diameter greater than that of the rod portion 17, adapted to receive a plurality of packing rings 38, which are preferably braided copper tinsel packing rings, or similar metallic rings. To retain the rings 38 within the enlarged diameter portion of the sleeve opening, a bushing 39 is inserted in the outer end of the opening, with the outer end of the bushing 39 being engaged by a cover 40. The cover 40 is preferably formed in two parts 41 and 42 secured together by screws 43 and 44, to permit installation or removal thereof after assembly of other parts. A pair of screws 45 and 46 extend through the cover 40 and are threaded into the sleeve 35, to permit application of a desired degree of pressure to the packing rings 38, and obtain a proper seal while allowing axial movement of the valve part 17.

A ring portion 47, for supporting the actuating mechanism 18, is integrally supported from the outer end of the sleeve member 35 through a pair of axially extending portions 48 and 49 on opposite sides of the rod portion 17. The ring portion 47 is recessed to receive the outer race 50 of a ball bearing assembly 51, a bearing retainer ring 52 being secured to the ring portion 47 by screws 53. The ball bearing assembly 1 has an inner race 54 which is secured on an inwardly projecting portion 55 of the hub 26 by means of a washer 56 and a nut 57. A threaded connection is provided between the hub 26 and the rod portion 17, so that upon rotation of the hub portion 26, the valve part will be moved inwardly or outwardly.

The rod portion 17 is formed with a passage 58 having an inner end portion 59 communicating with the region between the bellows 23 and the packing 24. The passage 58 has an enlarged diameter portion 60 in which a piston member in the form of a ball 61 is disposed, to be moved outwardly in response to a certain fluid pressure in the region between bellows 23 and packing 24. The ball 61 engages the inner end of a rod 62 the outer end of which is secured to the cap or button 25. The rod 62 extends through a tubular plug 63 inserted into the outer end of the rod portion 17. At its inner end, the plug 63 is formed with a valve seat 64 adapted to be engaged by the ball 61 to prevent outward flow of fluid. Adjacent its outer end, the plug 63 has a radially extending bore which receives a spring 65 urging a detent ball 66 radially inwardly into engagement with a groove 67 in the indicator rod 62.

The detent ball 66 serves to hold the rod 62 and the button 25 in inward, inactive, positions as illustrated in FIGURE 2. Upon rupture of the bellows, fluid under pressure flows through the passage 58 to urge the ball 61 outwardly and thereby overcome the force of the detent ball 66 and move the rod 62 and indicator button 25 outwardly. To limit outward movement of the rod 62, it is provided with a head portion 68 at its inner end.

A cap member 69 is secured by screws 70 to the outer face of the hub 26 and has an opening 71 receiving the button 25 and an inwardly projecting portion 72 engageable by the outer end of the plug 63 to limit outward movement of the valve part. It may be noted that the position of the valve is indicated by a groove formed at the end of the threaded part of rod portion 17.

The bellows 23 is formed in a plurality of sections 73, 74, 75 and 76. The section 73 comprises three axially spaced smaller diameter portions 77, a pair of larger diameter portions 78, four radial wall portions 79 integrally connecting the portions 77 and 78, and a pair of radial end wall portions 80 and 81. The sections 74, 75 and 76 are of substantially the same construction.

The outer end wall 80 of the section 73 is secured to the inner end of the sleeve member 35 by a weld 82 and adjacent end walls of the sections 73, 74, 75 and 76 are secured together by welds 83, 84 and 85. The inner end wall of the section 76 is secured to a ring 86 by means of a weld 87, the ring 86 being secured by a weld 88 to the end portion of a shaft forming the rod portion 17. The weld 88 is ground down to form the surface portion 16 for engagement with the valve seat 14.

The illustrated bellows construction is particularly advantageous in obtaining high strength and high rigidity against radial displacement while permitting relatively free axial movement of the valve part. The arrangement with the bellows secured at its inner end to the valve part and at the outer end to the casing is advantageous in that fluid pressure is applied to the outside of the bellows to obtain increased protection against rupture. This arrangement is also advantageous when the valve is used with a fluid having a high freezing or solidification temperature. Heating blankets may be readily wrapped around the cylindrical portion 27 and the heat is applied directly therethrough to the fluid between the cylindrical portion 27 and the bellows.

The illustrated arrangement has a further advantage of being readily assembled. In particular, the bellows sections may be welded together and when welded to the sleeve 35 and the ring 86 with the weld 88 being formed to secure ring 86 to the rod portion 17. The assembly of the valve part, bellows and sleeve may then be inserted in the cylindrical portion 27 of the casing, after which the weld 36 is formed to integrally connect the sleeve member 35 to the cylindrical portion 27.

It may further be noted that the packing 24 is normally not exposed to the fluid and when used with fluids having a high solidification or freezing point, heat need not be applied to the packing 24. Accordingly, the packing and the sleeve portion 35 serve as insulating means between the fluid and the actuating mechanism 18. It may further be noted that the portions 48 and 49 which support the actuating mechanism from the sleeve portion 35 are of reduced cross-sectional area, to reduce the flow of heat. Accordingly, the handles, as well as the ball bearing assembly 51 are not subjected to high temperatures.

Due to the use of the ball bearing 51, and the fact that the valve part is not rotated but is moved only axially, the valve is extremely easy to operate.

It will be understood that modifications and variations may be effected without departing from the spirit and scope of the novel concepts of this invention.

I claim as my invention:

1. In a valve including a casing having inlet and outlet passages, a valve seat between said passages and a wall portion having an opening therethrough, a valve part having a surface portion engageable with said seat and a rod portion projecting outwardly through said opening, a metallic bellows around said rod portion integrally connected at one end to said valve part and integrally connected at the other end to said wall portion to prevent flow of fluid through said opening, said casing and said bellows forming a heat flow passage with the outer surface of said bellows continuously exposed thereto, a packing between said rod portion and said wall portion for preventing flow of fluid through said opening in the event of rupture of said bellows, and indicating means responsive to fluid pressure in the region between said bellows and said packing in substantially freely movable relationship to said rod portion to indicate rupture of said bellows.

2. In a valve including a casing having inlet and outlet passages, a valve seat between said passages and a wall portion having an opening therethrough, a valve part having a surface portion engageable with said seat and a rod portion projecting outwardly through said opening, a metallic bellows around said rod portion integrally connected at one end to said valve part and at the other end to said wall portion to prevent flow of fluid through said opening, a packing between said rod portion and said wall portion for preventing flow of fluid through said opening in the event of rupture of said bellows, said rod portion having an axially extending passage therein having an inner end in communication with the region between said bellows and said packing, and pressure indicating means on the outer end of said rod portion in communication with the outer end of said passage to indicate rupture of said bellows, said pressure indicating means in closely fitting relationship including piston means in said passage and movable outwardly in response to pressure resulting from rupture of said bellows.

3. In a valve including a casing having inlet and outlet passages, a valve seat between said passages and a wall portion having an opening therethrough, a valve part having a surface portion engageable with said seat and a rod portion projecting outwardly through said opening, a metallic bellows around said rod portion integrally connected at one end to said valve part and at the other end to said wall portion to prevent flow of fluid through said opening, a packing between said rod portion and said wall portion for preventing flow of fluid through said opening in the event of rupture of said bellows, said rod portion having an axially extending passage therein having an inner end in communication with the region between said bellows and said packing, and pressure indicating means on the outer end of said rod portion in communication with the outer end of said passage to indicate rupture of said bellows, said pressure indicating means in closely fitting relationship including piston means in said passage such as to render said piston means movable outwardly in response to pressure resulting from rupture of said bellows, and detent means arranged to releasably hold said piston means in an inward position.

4. In a valve including a casing having inlet and outlet passages, a valve seat between said passages and a wall portion having an opening therethrough, a valve part having a surface portion engageable with said seat and a rod portion projecting outwardly through said opening, a metallic bellows around said rod portion integrally connected at one end to said valve part and at the other end to said wall portion to prevent flow of fluid through said opening, a packing between said rod portion and said wall portion for preventing flow of fluid through said opening in the event of rupture of said bellows, said rod portion having an axially extending passage therein having an inner end in communication with the region between said bellows and said packing, said passage having an enlarged diameter intermediate portion, a piston element in said intermediate portion dimensioned to move outwardly in response to pressure resulting from rupture of said bellows, indicating means including a rod actuated by said piston element and extending from said intermediate portion of said passage outwardly through said passage, and a valve seat at the outer end of said intermediate portion of said passage engageable by said piston to prevent outward flow of fluid beyond said piston.

5. In a valve including a casing having inlet and outlet passages, a valve seat between said passages and a wall portion having an opening therethrough, a valve part having a surface portion engageable with said seat and a rod portion projecting outwardly through said opening, a metallic bellows around said rod portion integrally connected at one end to said valve part and at the other end to said wall portion to prevent flow of fluid through said opening, a packing between said rod portion and said wall portion for preventing flow of fluid through said opening in the event of rupture of said bellows, said rod portion having an axially extending passage therein having an inner end in communication with the region between said bellows and said packing, said passage having an enlarged diameter intermediate portion, and a ball in said intermediate portion forming a piston element in closely fitting relationship in said intermediate portion whereby to afford movement thereof outwardly in response to pressure resulting from rupture of said bellows.

6. In a valve including a casing having inlet and outlet passages, a valve seat between said passages and a wall portion having an opening therethrough, a valve part having a surface portion engageable with said seat and a rod portion projecting outwardly through said opening, a bellows around said rod portion integrally connected at one end to said valve part and at the other end to said wall portion to prevent flow of fluid through said opening, a packing between said rod portion and said wall portion for preventing flow of fluid through said opening in the event of rupture of said bellows, said rod portion having an axially extending passage therein having an inner end in communication with the region between said bellows and said packing, and pressure indicating means on the outer end of said rod portion in communication with the outer end of said passage to indicate rupture of said bellows.

References Cited in the file of this patent

UNITED STATES PATENTS

| | | |
|---|---|---|
| 1,923,306 | Hagen | Aug. 22, 1933 |
| 1,983,106 | Sundstrom | Dec. 4, 1934 |
| 1,996,309 | Simpson | Apr. 2, 1935 |
| 2,228,849 | Sandos | Jan. 14, 1941 |
| 2,691,773 | Lichtenberger | Oct. 12, 1954 |
| 2,699,801 | Schleyer | Jan. 18, 1955 |
| 2,797,063 | Hobbs | June 25, 1957 |
| 2,888,037 | Jones | May 26, 1959 |